Sept. 4, 1962     W. S. LITTLETON ETAL     3,052,054
HUNTER'S BLIND
Filed July 25, 1960
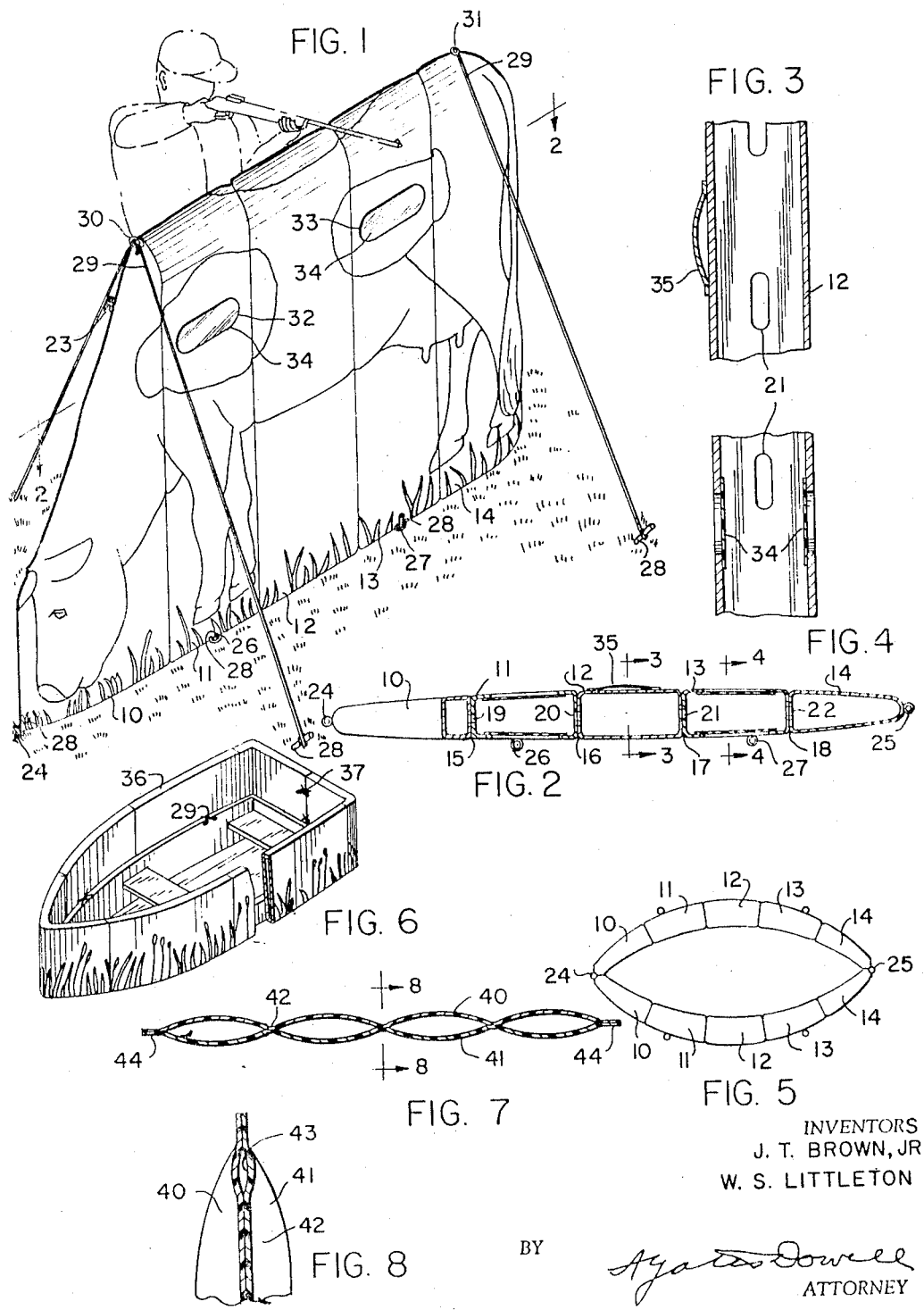
INVENTORS
J. T. BROWN, JR
W. S. LITTLETON
BY
ATTORNEY

United States Patent Office 3,052,054
Patented Sept. 4, 1962

3,052,054
HUNTER'S BLIND
William S. Littleton, 3926 Venice Blvd., and James T. Brown, Jr., 409 E. Concord Ave., both of Orlando, Fla.
Filed July 25, 1960, Ser. No. 45,037
4 Claims. (Cl. 43—1)

This invention relates to sports including hunting and fishing, to equipment employed, and especially to that intended to perform the function of camouflaging the presence of the hunter.

The invention relates particularly to a blind for use in the hunting of duck or other game for concealing the hunter without materially interfering with the hunter in the shooting of the game.

Blinds for attracting game and for concealing the presence of hunters have been complicated, excessively massive, cumbersome, not readily transportable, easily damaged or destroyed and otherwise ineffective and unsatisfactory.

It is an object of the invention to provide a hunters blind of relatively simple and inexpensive construction capable of being made to resemble either animate or inanimate objects, inflatable and deflatable, which easily can be transported and placed in position to be used on land or water.

Other objects and advantages of the invention will be apparent from the following description taken in conjunction with the accompanying drawings wherein:

FIG. 1 is a perspective illustrating one application of the invention;

FIG. 2, a horizontal section on the line 2—2 of FIG. 1;

FIG. 3, an enlarged fragmentary detail section on the lines 3—3 of FIG. 2;

FIG. 4, an enlarged fragmentary section on the line 4—4 of FIG. 2;

FIG. 5, a top plan view illustrating a further use of the invention;

FIG. 6, a modified form of the invention;

FIG. 7, a section similar to FIG. 2 of a further modified form of the invention; and FIG. 8, an enlarged fragmentary section on the line 8—8 of FIG. 7.

Briefly stated, the invention is a hunter's blind composed of a series of connected inflatable units joined together and given the overall form and appearance of animate or inanimate objects but of light weight for ready transportation and inflation for use and deflated after such use and with inflation either by the mouth, small pump or compressed air cartridge.

With continued reference to the drawing, the blind of the present invention includes a series of connected inflatable units 10, 11, 12, 13, and 14, which may be composed of flexible air retention material such as rubber, synthetic rubber, plastic, treated canvas, or other impregnated cloth or material which can be made into inflatable objects.

The units are united along joints 15, 16, 17, and 18 thermally, by cement, or in other desired manner, and with openings 19, 20, 21 and 22 in the walls of the joints 15, 16, 17 and 18 to permit the inflation of the several units and one or more inflation tubes 23 (FIG. 1) may be provided through which air can be forced into the several units.

As illustrated the blind of the present invention may be of a size and appearance to simulate any four footed animal such as a cow, or a clump of vegetation such as tall grass or the like, and when inflated will have a height sufficient to permit a man or two to crouch behind the same and be substantially concealed from the view of game on the opposite side of the blind.

In the use of the invention, the blind is inflated and then anchored in position. In order to secure it in position attaching rings 24 and 25 are fastened to the terminal units 10 and 14, and one or more intermediate rings 26 to 27 may be provided and adapted to be held by anchor means such as stakes 28 along the bottom of the blind. Also guy wires or cables 29 may be used with their upper ends attached at spaced locations along the top of the blind to rings 30 and 31 and their lower ends attached to additional stakes 28.

In order to provide visibility through the blind, window or lookout openings 32 and 33 may be provided.

Also, the blind may have one or more pockets 35 attached to its rear surface for holding ammunition or other objects. The blind thus provides an attractive representation plus a shield for hunters behind which they may crouch and be obscured from view.

The blind may be of a different design, for example, composed, as illustrated in FIG. 6 of one or more elongated units 36 of three or four feet in height and of any desired length up to 16 feet with terminal rings 37 by which the blind may be secured in place on land or sea, including about a boat, the anchoring being by cables, or cords 29 attached to the earth, to a boat, or by draw cords about the boat or other object.

With reference to the FIGS. 7 and 8, the blind may be constructed of two sheets of plastic or other thermal responsive material 40 and 41 capable of being joined by the application of heat. The sheets 40 and 41 are connected along their lengths by heat seals 42 to form a series of compartments. The seals extend substantially the full height of the blind with a small portion 43 along the length of the seal 42 left open so that air can pass from one compartment to the adjoining compartment. The ends of the sheets 40 and 41 are sealed and may have openings 44 therein so that two of such units may be tied together in a manner similar to that shown in FIG. 5.

It will be obvious to one skilled in the art that various changes may be made in the invention without departing from the spirit and scope thereof and therefore the invention is not limited by that which is illustrated in the drawings and described in the specification, but as indicated in the accompanying claims.

What is claimed is:

1. A blind for use by hunters comprising a series of individual relatively light weight inflatable units united along their contiguous edges and with communicating openings therebetween, said combined units having an overall external appearance and configuration of natural phenomena and being of a width and height to afford concealment for hunters, said combined units having inflated openings through which inflation may be accomplished prior to used and deflation after use to facilitate transportation and storage, said units having a sight opening through which a hunter behind the blind may view the area in front of the blind, transparent cover means for said sight opening, and guy wire means for fastening said blind in operative position to provide a camouflage for hunters therebehind.

2. A blind for use by hunters comprising a series of individual plastic relatively light weight inflatable units united along their contiguous edges and with communicating openings through such edges, means for inflating and deflating said units, said combined units having an overall external appearance and configuration of a farm animal and being of a width and height to afford concealment for hunters, said units having a sight opening through which a hunter on one side may view the area on the opposite side of the blind, and transparent cover means for said sight opening.

3. A blind for use by hunters comprising a lightweight inflatable unit, said unit being constructed of two sheets of thermal responsive material connected by a series of heat sealed portions, said portions extending substantially the full height of the blind to form a plurality of compartments with communicating openings, said unit having an external appearance of an animal or vegetation and being of a width and height to afford concealment for hunters, means for inflating said unit, a sight opening through which a hunter on one side of the blind may view the area on the opposite side of the blind, and transparent cover means for said sight opening.

4. A blind for use by hunters comprising a series of individual plastic relatively light weight inflatable units united along their contiguous edges and with communicating openings through such edges, said contiguous edges extending along said units between the top and bottom thereof in a manner to provide stiffening and reinforcing portions for facilitating the maintenance of the blind in upright position, said combined units having an overall external appearance and configuration of one or more objects familiar to the game hunted and being of a width and height to provide concealment for hunters, said combined units having an opening through which inflation may be accomplished prior to use and deflation after use and to facilitate transportation and storage, said units having a sight opening through which a hunter on one side of the blind may view the area on the opposite side thereof, transparent cover means for said sight opening, said units having terminal rings by which the blind may be anchored in a position of use.

References Cited in the file of this patent
UNITED STATES PATENTS

| | | |
|---|---|---|
| 586,145 | Sievers | July 13, 1897 |
| 1,406,916 | Arnold | Feb. 14, 1922 |
| 1,504,079 | Roberts | Aug. 5, 1924 |
| 1,604,615 | Stoner | Oct. 26, 1926 |
| 2,827,729 | Hoene | Mar. 25, 1958 |
| 2,873,459 | Marz | Feb. 17, 1959 |
| 2,992,503 | Webb | July 18, 1961 |